(12) United States Patent
Lalgudi

(10) Patent No.: US 11,905,460 B2
(45) Date of Patent: Feb. 20, 2024

(54) SCALE INHIBITORS AND RELATED CONTROLLED RELEASE PARTICLES

(71) Applicant: LFS CHEMISTRY INCORPORATED, Cresson, TX (US)

(72) Inventor: Ramanathan S. Lalgudi, Westerville, OH (US)

(73) Assignee: LFS CHEMISTRY INCORPORATED, Cresson, TX (US)

( * ) Notice: Subject to any disclaimer, the term of this patent is extended or adjusted under 35 U.S.C. 154(b) by 0 days.

(21) Appl. No.: 18/003,442

(22) PCT Filed: Jul. 20, 2022

(86) PCT No.: PCT/US2022/037694
§ 371 (c)(1),
(2) Date: Dec. 27, 2022

(87) PCT Pub. No.: WO2023/003943
PCT Pub. Date: Jan. 26, 2023

(65) Prior Publication Data
US 2024/0026212 A1    Jan. 25, 2024

Related U.S. Application Data

(60) Provisional application No. 63/224,439, filed on Jul. 22, 2021, provisional application No. 63/341,550, filed on May 13, 2022.

(51) Int. Cl.
*C09K 8/536* (2006.01)

(52) U.S. Cl.
CPC .......... *C09K 8/536* (2013.01); *C09K 2208/32* (2013.01)

(58) Field of Classification Search
CPC ............................. C09K 8/536; C09K 2208/32
See application file for complete search history.

(56) References Cited

U.S. PATENT DOCUMENTS

| | | | |
|---|---|---|---|
| 2009/0038799 A1 | 2/2009 | Garcia-Lopez de Victoria et al. | |
| 2014/0162911 A1* | 6/2014 | Monastiriotis | C09K 8/805 507/221 |
| 2014/0262247 A1 | 9/2014 | Duenckel et al. | |
| 2016/0137904 A1* | 5/2016 | Drake | C09K 8/536 507/219 |
| 2019/0112520 A1* | 4/2019 | Knoer | C09K 8/805 |

FOREIGN PATENT DOCUMENTS

| | | | | |
|---|---|---|---|---|
| GB | 2244050 A | * | 11/1991 | ................ C02F 5/14 |
| WO | 2014186220 A1 | | 11/2014 | |
| WO | 2015112130 A1 | | 7/2015 | |

OTHER PUBLICATIONS

Written Opinion and International Search report of corresponding PCT Application No. PCT/US2022/037694 dated Nov. 9, 2022.
Zhang, Ping, Shen, Dong, Fan, Chunfang, Kan, Amy T., and Mason B. Tomson. "Surfactant-Assisted Synthesis of Metal-Phosphonate Inhibitor Nanoparticles and its Transport in Porous Media." Paper presented at the SPE International Symposium on Oilfield Chemistry, The Woodlands, Texas, Apr. 2009.

* cited by examiner

*Primary Examiner* — Kumar R Bhushan
(74) *Attorney, Agent, or Firm* — Vorys, Sater, Seymour, and Pease LLP

(57) ABSTRACT

Controlled release particles may include stimuli-responsive coatings on porous particles to allow for controlled release of a material in the pores of the porous particles. For example, a composition may comprise: a porous particle; a material in pores of the porous particle; and a coating bonded to a surface of the porous particle, wherein the coating comprises a multi-urethane compound capable of reversibly converting between a condensed state and an expanded state upon exposure to a stimuli.

11 Claims, 7 Drawing Sheets

Where $R^1$ =

-$CH_2$-$CH_2$- ;

-$CH_2$-$CH_2$-NH-$CH_2$-$CH_2$- ;

-$CH_2$-$CH_2$-NH-$CH_2$-$CH_2$-NH-$CH_2$-$CH_2$- ;

-$CH_2$-$CH_2$-NH-$CH_2$-$CH_2$-NH-$CH_2$-$CH_2$-NH-$CH_2$-$CH_2$- ;

n= 1-500

Where $R^2$ =

—H

—Me

SCALE INHIBITORS AND RELATED CONTROLLED RELEASE PARTICLES

FIELD

The present disclosure relates to scale inhibitors and controlled release particles suitable for controlled release of said scale inhibitors and/or other materials.

BACKGROUND

Particles that release a compound or other payload in a desired location and/or at a desired time are desirable in many industries including pharmaceuticals, oil and gas exploration and production (e.g., for scale and/or corrosion inhibition), water treatment, and agriculture. Several technologies have been developed around controlled release particles.

For example, liposomes may be used to encapsulate a material where the liposome breaks or becomes leaky upon a stimulus that allows for release of the encapsulated material. In another example, porous particles loaded with materials in the pores of said particle may be coated with a degradable coating or self-degradable coating (e.g., polylactic acid) where upon exposure to water, for example, the coating degrades allowing the encapsulated material to exit the pores of the particles. In each of these cases, the encapsulating material (i.e., the liposome, the degradable coating, and self-degradable coating) are compromised, preferably at the desired location or time, and all of the payload is released. Accordingly, premature or late compromise of the encapsulating material may significantly reduce the efficacy of the controlled release particles.

SUMMARY

The present disclosure relates to scale inhibitors and controlled release particles suitable for controlled release of said scale inhibitors and/or other materials.

A nonlimiting example composition of the present disclosure comprises:

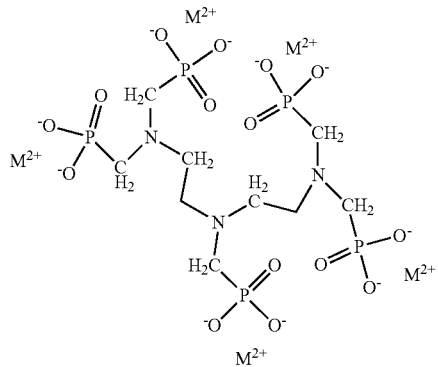

where $M^{2+}$ is a bivalent metal cation (e.g., zinc, nickel, cadmium, manganese, and the like).

Another nonlimiting example composition of the present disclosure comprises: (i) the foregoing compound and (ii) a porous particle, a nonporous particle, or a mixture of the porous particle and the nonporous particle. The use of said particle(s) may provide controlled release of the foregoing compound.

The foregoing compound (with or without a particle(s)) may be useful as a scale inhibitor in downhole applications. For example, a method of the present disclosure may comprise: introducing the foregoing compound (with or without a particle(s)) into a wellbore penetrating a subterranean formation; and mitigating scale formation on and/or corrosion of downhole wellbore tools (e.g., tubulars).

The present disclosure further relates to controlled release particles that comprise stimuli-responsive coatings on porous particles to allow for controlled release of an encapsulated material (e.g., the foregoing compound) in the pores of the porous particles. Other suitable materials include, but are not limited to, other scale inhibitors, corrosion inhibitors, asphaltene precipitation inhibitors, microbially produced sulfate and nitrate inhibitors, hydrogen sulfide scavengers, surfactants, lubricants, chelating agents, the like, and any combination thereof.

A nonlimiting example composition of the present disclosure comprises: a porous particle; a material in pores of the porous particle; and a coating bonded to a surface of the porous particle, wherein the coating comprises a multi-urethane compound capable of reversibly converting between a condensed state and an expanded state upon exposure to a stimuli.

A nonlimiting example method of the present disclosure comprises: introducing the foregoing controlled release particle into a wellbore penetrating a subterranean formation; and exposing the controlled release particle to a stimuli so as to (a) transition the coating from a condensed state to an expanded state and (b) release at least a portion of the material from the pores of the porous particle.

A nonlimiting example method of the present disclosure comprises: reacting an amine and a cyclic carbonate to produce a multi-urethane backbone; reacting the multi-urethane backbone with a coupling compound to yield a multi-urethane compound comprising the multi-urethane backbone and two or more coupling moieties capable of bonding to a surface of a porous particle; bonding the multi-urethane compound to the surface of the porous particle; and loading pores of the porous particle with a material.

BRIEF DESCRIPTION OF THE DRAWINGS

The following figures are included to illustrate certain aspects of the disclosure, and should not be viewed as exclusive configurations. The subject matter disclosed is capable of considerable modifications, alterations, combinations, and equivalents in form and function, as will occur to those skilled in the art and having the benefit of this disclosure.

DETAILED DESCRIPTION

Figure 1:
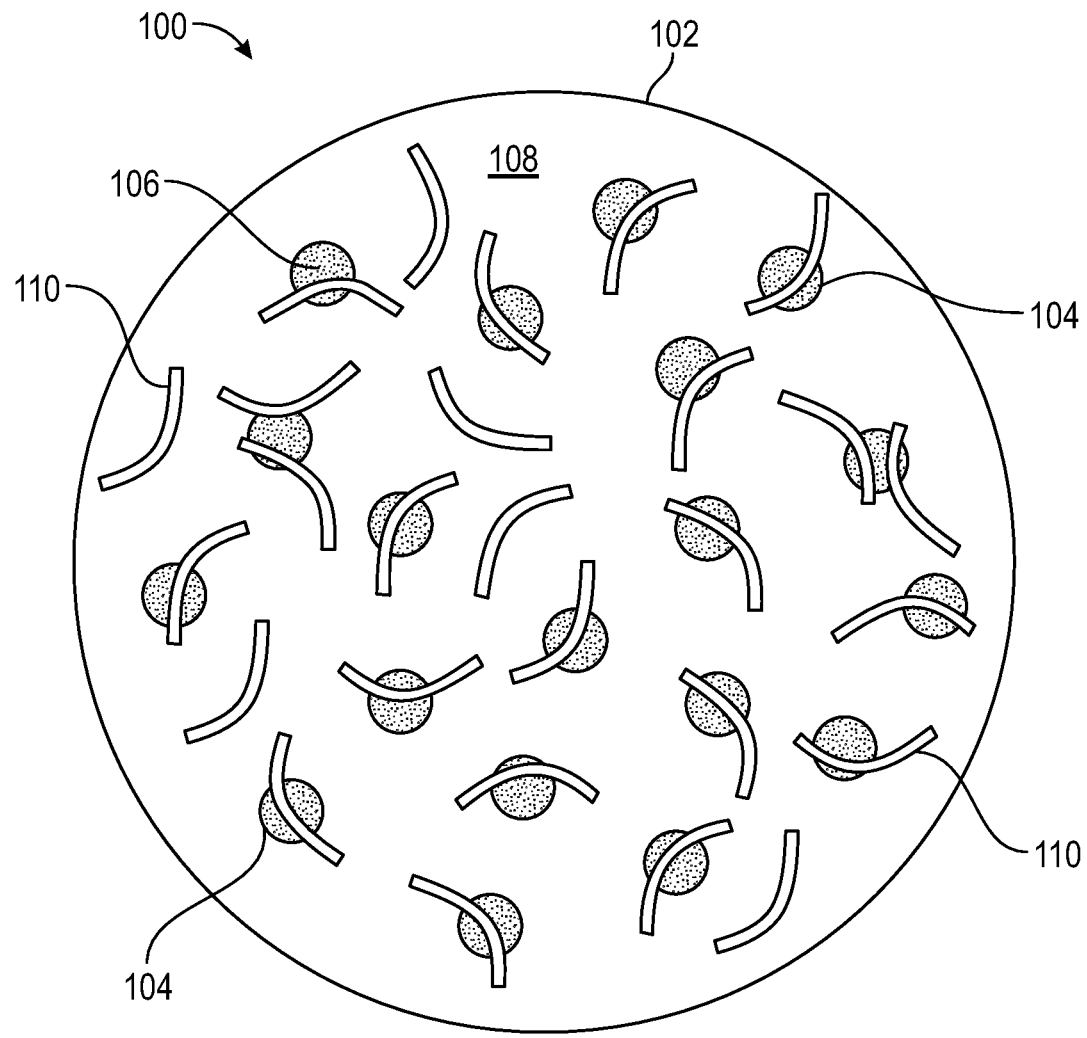
FIG. 1 is a diagram illustrating a nonlimiting example of a controlled release particle of the present disclosure.

The present disclosure relates to scale inhibitors and controlled release particles suitable for controlled release of said scale inhibitors and/or other materials.

Pentametal; [bis[2-[bis(phosphonomethyl)amino] ethyl]amino]methylphosphonic acid (Scale Inhibitor) and Related Controlled Release Particles Pentametal; [bis[2-[bis(phosphonomethyl)amino]ethyl]amino]methylphosphonic acid has a formula according to Compound I. A specific example is pentazinc; [bis[2-[bis (phosphonomethyl)amino]ethyl]amino]methylphosphonic acid, which has a formula according to Compound I.

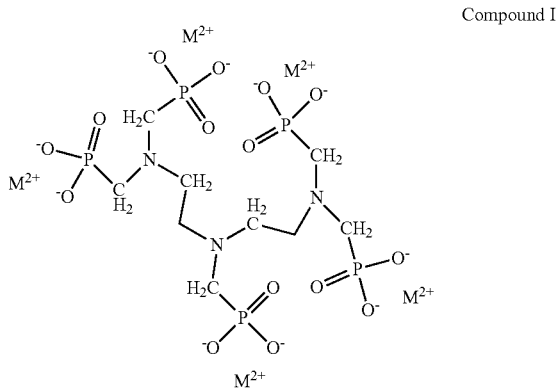

Compound I where $M^{2+}$ is a bivalent metal cation.

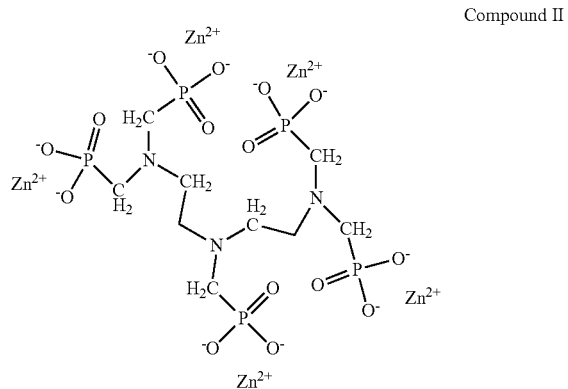

Compound II

Compound I may be synthesized by mixing a bivalent metal salt with diethylenetriaminepenta(methylenephosphonic acid) to allow for ion exchange and precipitation of Compound I. Generally, the bivalent metal salt may be dissolved in water and combined with the diethylenetriaminepenta(methylenephosphonic acid). After Compound I precipitates, the precipitate may be separated from at least a portion of the liquid (e.g., via filtration, decanting, centrifuging, the like, and any combination thereof). If a solid form of Compound I is desired, the precipitate may be washed and dried.

The bivalent metal cation of the bivalent metal salt may include, but is not limited to, zinc, nickel, cadmium, manganese, and the like. The anion of the bivalent metal salt may include, but is not limited to, chlorides, fluorides, bromides, sulfates, nitrates, acetates, and the like. Examples of specific bivalent metal salts may include, but are not limited to, zinc chloride, nickel chloride, cadmium chloride, manganese chloride, zinc fluoride, nickel fluoride, cadmium fluoride, manganese fluoride, zinc bromide, nickel bromide, cadmium bromide, manganese bromide, zinc sulfate, nickel sulfate, cadmium sulfate, manganese sulfate, zinc nitrate, nickel nitrate, cadmium nitrate, manganese nitrate, zinc acetate, nickel acetate, cadmium acetate, manganese acetate, and the like. The bivalent metal salt may have a number of waters of hydration ranging from zero to ten.

Dissolution of the metal salt and the mixing may, independently, be at room temperature or at an elevated temperature (e.g., about 25° C. to about 70° C., or about 25° C. to about 50° C., or about 35° C. to about 60° C., about 45° C. to about 70° C.).

Compound I may be useful as a scale inhibitor and/or a corrosion inhibitor in downhole applications. Accordingly, methods may include introducing Compound I into a wellbore penetrating a subterranean formation; and mitigating scale formation on and/or corrosion of downhole wellbore tools (e.g., tubulars) present in the wellbore. Compound I may be introduced as an additive in a wellbore fluid (e.g., an aqueous-based wellbore fluid, an emulsion wellbore fluid with a continuous water phase, or an invert emulsion wellbore fluid with a discontinuous (or dispersed) water phase) where Compound I may be present at about 0.001 wt % to about 10 wt % (or about 0.001 wt % to about 1 wt %, or about 0.01 wt % to about 2 wt %, or about 0.1 wt % to about 5 wt %, or about 2 wt % to about 10 wt %) of the water in the wellbore fluid.

Compound I may be a portion of a controlled release particle that is introduced into the wellbore. The controlled release particle may be a porous particle with Compound I absorbed in the pores thereof. The controlled release particle may be a controlled release particle with a stimuli-responsive coating (described in detail below). Accordingly, methods may include introducing the a controlled release particle comprising Compound I into a wellbore penetrating a subterranean formation; allowing Compound I to release from the controlled release particle while in the wellbore; and mitigating scale formation on and/or corrosion of downhole wellbore tools (e.g., tubulars) present in the wellbore.

To create a controlled release particle comprising Compound I and a porous particle, Compound I and the porous particle may be mixed (or kept in contact) for a sufficient time to absorb Compound I into the pores of the porous particle. Such sufficient time may depend on the pore size of the porous particle and the relative concentrations of Compound I and the porous particle. Water is preferably present during the mixing (or contacting) step. After mixing, the product may be washed and optionally dried before use. Alternatively, a majority (e.g., at least 50 wt %, or at least 75 wt %) of the liquid portion of the product may be removed (e.g., via filtration, decanting, centrifuging, the like, and any combination thereof) and the product with liquid still present may be blended with other components (e.g., nonporous particles, surfactants, polymers, weighting agents, and the like) to produce a wellbore fluid or an additive for said wellbore fluid. The wellbore fluid may be aqueous-based, oil-base, an emulsion, or an invert emulsion where for the emulsion and invert emulsion the location of the controlled release particle may depend on the structure and/or surface chemistry of the controlled release particle.

During the mixing (or contacting) step, the weight ratio of Compound I to the porous particle may be about 0.1:1 to about 2:1 (or about 0.1:1 to about 1:1, or about 0.5:1 to about 1.5:1, or about 1:1 to about 2:1). After absorption, the weight ratio of Compound I to the porous particle (measured on a dried sample) may be about 0.01:1 to about 1:1 (or about 0.01:1 to about 0.5:1, or about 0.1:1 to about 1:1, or about 0.5:1 to about 1:1).

Controlled release particles comprising Compound I may be present at about 0.001 wt % to about 10 wt % (or about 0.001 wt % to about 1 wt %, or about 0.01 wt % to about 2 wt %, or about 0.1 wt % to about 5 wt %, or about 2 wt % to about 10 wt %) of the liquid in the wellbore fluid.

Porous particles of the controlled release particles may include, but are not limited to, porous amorphous silica, cyclodextrin, carbon nanotubes, metal organic frameworks (MOFs), zeolites, porous clay minerals, the like, and any combination thereof.

Nonporous particles that may be included in wellbore fluid or additives for wellbore fluids in conjunction with the controlled release particle comprising Compound I may include, but are not limited to, sand, polymer beads, carbon black, graphite carbon, milled products from biomass, algae, plastic waste, the like, and any combination thereof.

While the foregoing methods focus on Compound I, other scale inhibitors may be used in place of Compound I in the foregoing or in combination with Compound I in the foregoing. Such scale inhibitors may be phosphonates, sulfonates, and carboxylates, or combinations thereof. Examples of phosphonate scale inhibitors may include, but are not limited to, nitrilotri(methylphosphonic acid), n,n-bis (phosphonomethyl)glycine, iminodi(methylphosphonic acid), (aminomethyl)phosphonic acid, methylenediphosphonic acid, diethylenetriaminepentakis(methylphosphonic acid), 2-hydroxyethyl imino bis(methylene)) bisphosphonic acid, amino-tris(methylenephosphonate), poly(vinyl phosphonic acid), the like, and any combination thereof. Examples of sulfonate scale inhibitors may include, but are not limited to, sulfo succinic acid, benzene sulfonic acid, naphthalene sulfonaic acid, vinyl sulfonic acid, poly vinyl sulfonic acid, styrene sulfonic acid, polystyrene sulfonic acid, the like, and any combination thereof. Examples of carboxylate scale inhibitors may include, but not limited to, ethylenediaminetetraacetic acid (EDTA), nitrilotriacetic acid, polyacrylic acid, the like, and any combination thereof.

Further, while the foregoing methods focus on wellbore applications to mitigate scale formation on and/or corrosion of downhole wellbore tools, Compound I and controlled release particles comprising Compound I may be useful in other applications including water treatment.

Controlled Release Particles with Stimuli-Responsive Coatings

The present disclosure also relates to controlled release particles that comprise stimuli-responsive coatings on porous particles to allow for controlled release of a material in the pores of the porous particles. More specifically, the coating comprises at least one multi-urethane compound capable of reversibly transitioning between a condensed state and an expanded state upon exposure to a stimuli, where in the expanded state the material in the pores may exit the pores of the porous particle into the surrounding environment. As used herein, the term "multi-urethane" is a compound having two or more urethane moieties. Multi-urethanes may have 2 to 50 or more (or 2 to 24, or 6 to 18, or 8 to 20, or 8 to 30, or 26 to 40, or 30 to 50 or more) urethane moieties.

Advantageously, the multi-urethane compounds of the stimuli-responsive coating is bonded to the porous particles and is capable of reversible transition between two states: (a) a condensed state where preferred structural conformations that mitigate release of a material from the pore openings that are at least partially covered by the compound and (b) an expanded state where preferred structural conformations allow for release of the material from the pore openings that had been covered. Accordingly, if a stimulus is encountered, the multi-urethane compounds of the stimuli-responsive coating may transition to the expanded state and release a portion of the material. However, once the stimulus is removed and/or reversed, the multi-urethane compounds may transition back to the condensed state and mitigate, if not completely stop, release of the material until the desired stimulus is encountered.

Without being limited by theory, it is believed that because of the reversible transition, the controlled release particles may be reused. For example, after a first use, the controlled release particles may be collected. Then, a stimulus may be applied to place the multi-urethane compound in the expanded state and exposed to a high concentration of the material to be placed into the pores. Without being limited by theory, it is further believed that by a concentration gradient mechanism, the controlled release particles may be reloaded with the same or a different material and the multi-urethane compound transitioned back to the condensed state used in additional methods and applications.

The controlled release particles of the present disclosure comprise a porous particle, a material in the pores of the porous particle, and a coating bonded (e.g., via covalent bonding, hydrogen bonding, ionic bonding, and the like) to the surface of the porous particle. The coating comprises at least one multi-urethane compound capable of reversibly transitioning between a condensed state and an expanded state upon exposure to a stimuli, where in the expanded state the material may exit the pores of the porous particle into the surrounding environment. The environment is generally a liquid environment and the expanded state allows the material in the pores of the porous particle to move from the pores and into the liquid environment.

FIG. 1 is a diagram illustrating a nonlimiting example of a controlled release particle 100 of the present disclosure. The illustrated controlled release particle 100 includes a porous particle 102 having pores 104 with a material 106 therein. On a surface 108 of the porous particle 102 is a coating comprising at least one multi-urethane compound 110. In the illustrated diagram, some of the multi-urethane compound 110 extends across the outlets of the pores 104, which may prevent the release of the material 106 from the pores 104.

Figure 2:
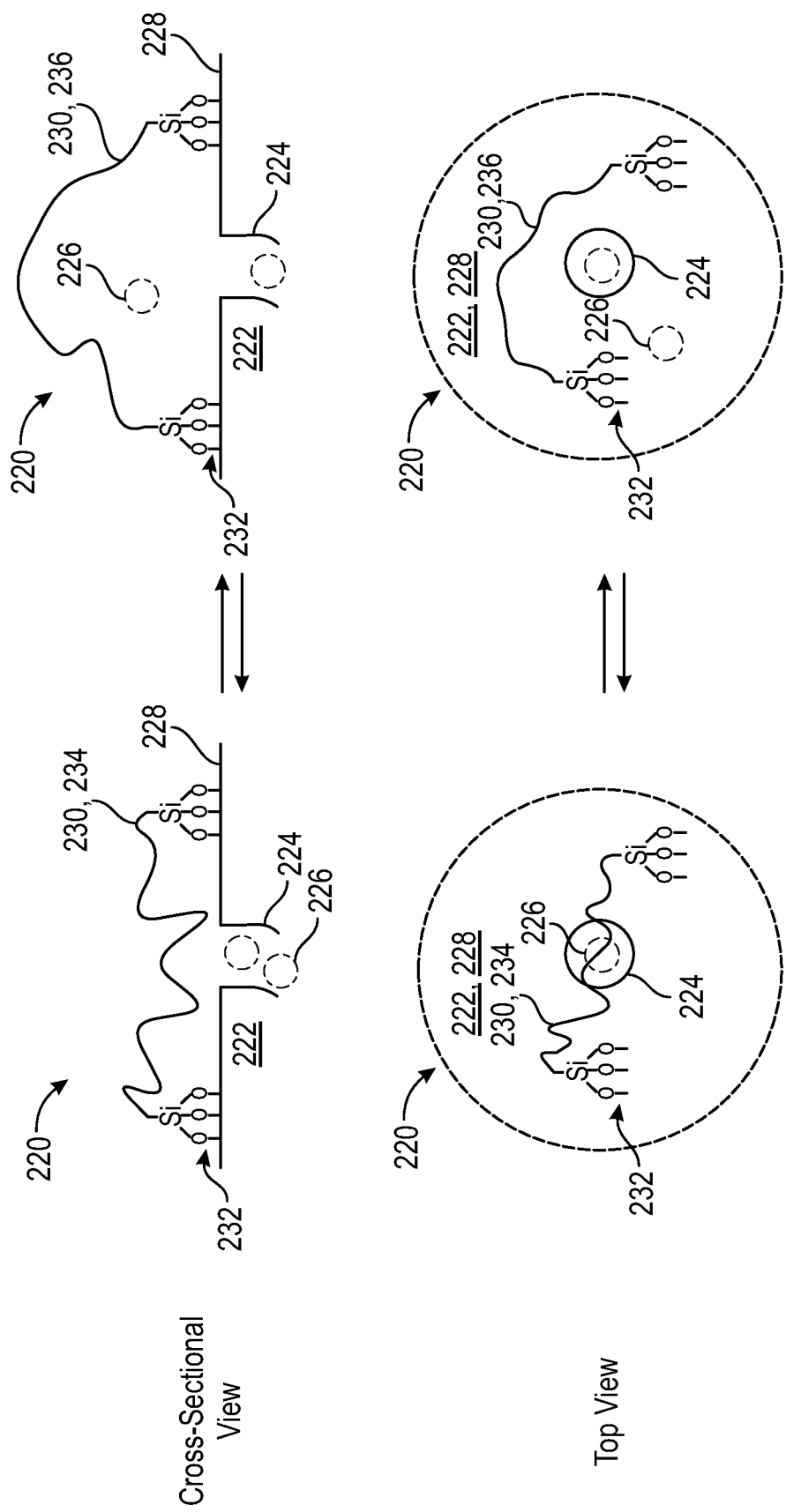
FIG. 2 is a diagram of a proposed mechanism by which the controlled release particles behave.

FIG. 2 is a diagram of a proposed mechanism by which the controlled release particles behave. The top proposed mechanism scheme shows a cross-sectional view of a portion of a controlled release particle 220, and the bottom proposed mechanism scheme shows a top view of a portion of a controlled release particle 220. The illustrated controlled release particle 220 includes a porous particle 222 having pores 224 with a material 226 therein. On a surface 228 of the porous particle 222 is a coating comprising at least one multi-urethane compound 230. In the illustrated diagram, the multi-urethane compound 230 comprises two terminal coupling moieties (one at each end of the multi-urethane compound 230) that are bonded 232 (illustrated here as covalent bonding but other bonding mechanisms like hydrogen bonding and ionic bonding may be achieved using different coupling moieties) to the surface 228 of the porous particle 222. The coupling moieties bond the multi-urethane compound to the surface of the porous particles.

The illustrated proposed mechanism shows the multi-urethane compound 230 in a contracted conformation 234 on the left of the mechanism and in an expanded conformation 236 on the right of the mechanism. The extended conformation 236 of the multi-urethane compound 230 extends away from the surface 228 into the surrounding environment to a greater degree than the contracted conformation 234 of the multi-urethane compound 230. The extended conformation 236 may allow for at least a portion of the material 226 to exit the pores 224 and enter the surrounding environment.

Without being limited by theory, it is believed application of a stimulus increases the multi-urethane compound's 230 accessibility to an expanded conformation 236 because the stimulus causes (a) a conformational change and/or (b) increases the degrees of freedom for the movement of the multi-urethane compound 230 to allow for the expanded conformation 236 to be more likely as compared to when the stimulus is not applied. That is, when a stimulus is applied, the probability of the multi-urethane compound 230 being in an expanded conformation 236 is greater than the probability of the multi-urethane compound 230 being in the expanded conformation 236 without said stimulation. Further, the probability of the multi-urethane compound 230 being in a contracted conformation 234 is greater when said stimulus is removed or reversed than the probability of the multi-urethane compound 230 being in the contracted conformation 234 with the stimulation being present. Herein, an "expanded state" of the multi-urethane compound refers to a condition of the multi-urethane compound where expanded conformations have a higher probability than in a "condensed state" of the multi-urethane compound. Further, the "condensed state" of the multi-urethane compound refers to a condition of the multi-urethane compound where contracted conformations have a higher probability than in the "expanded state" of the multi-urethane compound.

In preferred embodiments, the transition between states is fully reversible. That is, application of a stimulus converts the multi-urethane compound from a condensed state to an expanded state. Further, removal and/or reversal of the stimulus converts multi-urethane compound from an expanded state to a condensed state. Therefore, the multi-urethane compound is capable of reversibly converting between a condensed state and an expanded state upon exposure to a stimuli. Advantageously, this may allow for the controlled release particles to release a portion of the material by application of a stimulus and then significantly reduce, if not stop, the release by removing and/or reversing the stimulus. The ability to control the release in such a way may allow for releasing the material in a location with greater specificity, releasing the material in more than one location with minimal release between locations, or a combination thereof.

Examples of stimuli to transition the multi-urethane compound from a condensed state to an expanded state may include, but are not limited to, a change in temperature (e.g., an increase in temperature or a decrease in temperature), a change in pH (e.g., an increase in pH or a decrease in pH), an increase in ionic strength (e.g., increase salt concentration), an application of UV light, an application of an electric current, an application of a magnetic field, an application of an electro-magnetic field, an application of sonic energy, a presence of an enzyme, a presence of a microbial organism, the like, and any combination thereof.

By way of nonlimiting example, the multi-urethane compound may have a composition that at room temperature is at least partially crystalline having preferred conformations that are contracted. Then, upon increasing the temperature (e.g., to a temperature above a softening point of the multi-urethane compound) the multi-urethane compound may become more mobile such that expanded conformations are more probable than at room temperature. Such expanded conformations may allow for the material to exit pores. Then, decreasing the temperature may cause the bi-urethane compound to take on the contracted conformations preferred by the at least partially crystalline structure of the bi-urethane compound.

The foregoing nonlimiting example may be applied to the other stimuli described herein.

The multi-urethane compounds described herein comprise two or more coupling moieties that are capable of bonding (e.g., covalent bonding, hydrogen bonding, ionic bonding, and the like) to the surface of the porous particles. Examples of coupling moieties may include, but are not limited to, hydroxyls, amines, silanes, titanates, zirconates, vanadates, the like, and any combination thereof (e.g., a terminal silane moiety at one end and a terminal titanate moiety at the other). The foregoing moieties may be capable of one or more types of bonding mechanisms to the surface of the porous particles where the type of bonding mechanism may depend on, among other things, the surface chemistry of the porous particles, the coupling moiety, the conditions for coupling, the desired stimulus, the like, and any combination thereof.

Examples of coupling moieties that may be capable of covalent bonding with the surface of the porous particles may include, but are not limited to —$Si(OR)_x$ where R is hydrogen or methyl and x is 1-3, —$Ti(OR)_y$ where R is hydrogen or methyl and x is 1-3, —$Zr(OR)_z$ where R is hydrogen or methyl and x is 1-3; —$V(OR)_w$ where R is hydrogen or methyl and w is 1-3, the like, and any combination thereof. Accordingly, multi-urethane compounds may be bis-silane, multi-urethane compounds; bis-titanate, multi-urethane compounds; bis-zirconate, multi-urethane compounds; bis-vanadate, multi-urethane compounds; silane, titanate, multi-urethane compounds; silane, zirconate, multi-urethane compounds; silane, vanadate, multi-urethane compounds; titanate, zirconate, multi-urethane compounds; titanate, vanadate, multi-urethane compounds; or zirconate, vanadate, multi-urethane compounds. Any combination of the foregoing may be used in conjunction with the porous particles.

Specific, nonlimiting examples of bis-silane, multi-urethane (specifically, bis-urethanes in these examples) compounds include the following compounds.

Compound III

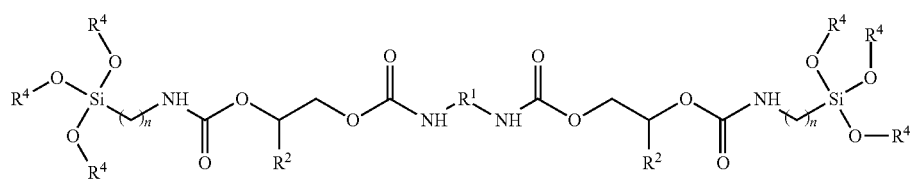

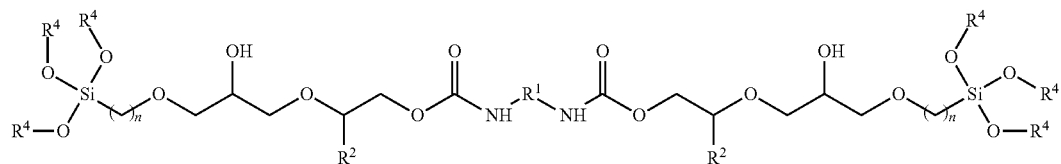

Compound IV where n=1-12;
R$^1$=—CH$_2$—CH$_2$—,
—CH$_2$—CH$_2$—NH—CH$_2$—CH$_2$—,
—CH$_2$—CH$_2$—NH—CH$_2$—CH$_2$—NH—CH$_2$—CH$_2$—,
—CH$_2$—CH$_2$—NH—CH$_2$—CH$_2$—NH—CH$_2$—CH$_2$—NH—CH$_2$—CH$_2$—,

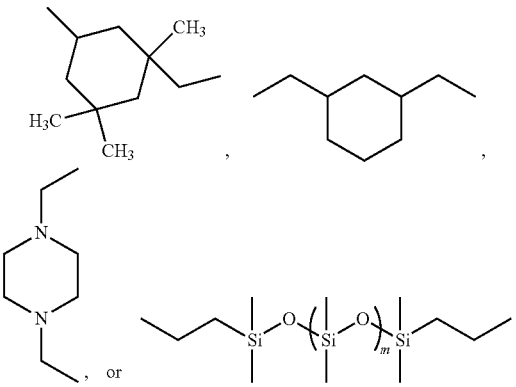

where m is 1-500;
R$^2$=hydrogen or methyl; and
R$^4$=methyl, ethyl, i-propyl, or t-butyl.

Examples of porous particles may include, but are not limited to, a porous carbon particle (e.g., activated charcoal, activated carbon, biochar, carbon nanotubes, and/or graphene), a porous silica particle (e.g., amorphous and/or precipitated silica), a porous natural mineral particle (e.g., diatomite, sandstone, calcite, stellerite, and/or vitric tuff), and a porous synthetic mineral particle (e.g., zeolites, metal-organic frameworks, layered double hydroxides, hydrated calcium aluminum silicate, and/or hydrated aluminum silicate), the like, and any combination thereof.

The porous particles may have weight average diameter of about 10 nm to about 2000 μm (or about 10 nm to about 500 nm, or about 100 nm to about 2 μm, or about 250 nm to about 1 μm, or about 1 μm to about 10 μm, or about 5 μm to about 20 μm, or about 10 μm to about 100 μm, or about 50 μm to about 250 μm, or about 200 μm to about 500 μm, or about 250 μm to abut 1000 μm, or about 500 μm to about 2000 μm).

The porous particles may have a N$_2$ BET surface area of about 100 m 2/g or greater (or about 100 m 2/g to about 2000 m 2/g, or about 100 m 2/g to about 1000 m 2/g, or about 500 m 2/g to about 1500 m 2/g, or about 1000 m 2/g to about 2000 m 2/g).

Examples of materials that may be placed in the pores include, but are not limited to, a small molecule, oligomers, DNA, RNA, a bacteria, a fungi, the like, and any combination thereof. As used herein, the term "small molecule" refers to a compound having a molecular weight of about 900 g/mol or less. As used herein, the term "oligomer" refers to a compound having a molecular weight of above 901 g/mol and below 30,000 g/mol.

Examples of small molecules may include, but are not limited to, scale inhibitors, corrosion inhibitors, asphaltene precipitation inhibitors, microbially produced sulfate and nitrate inhibitors, hydrogen sulfide scavengers, surfactants, lubricants, chelating agents, the like, and any combination thereof.

Examples of scale inhibitors may include, but are not limited to, acrylic acid oligomers, maleic acid oligomers, nitrilotri(methylphosphonic acid), Compound I (e.g., Compound II), n,n-bis(phosphonomethyl)glycine, iminodi(methylphosphonic acid), (aminomethyl)phosphonic acid, methylenediphosphonic acid, diethylenetriaminepentakis (methylphosphonic acid), 2-hydroxyethyl imino bis (methylene)) bisphosphonic acid, amino-tris (methylenephosphonate), poly(vinyl phosphonic acid), poly-phosphono carboxylic acid (PPCA), sulfo succinic acid, benzene sulfonic acid, naphthalene sulfonaic acid, vinyl sulfonic acid, poly vinyl sulfonic acid, styrene sulfonic acid, polystyrene sulfonic acid, ETDA, nitrilotriacetic acid, polyacrylic acid, the like, and any combination thereof.

Examples of corrosion inhibitors may include, but are not limited to, hexamine, phenylenediamine, dimethylethanolamine, sulfites, ascorbic acid, benzotriazole, imidazole, benzimidazole, thiazole, benzothiazole, Schiff base, 8-hydroxyl quinoline, methylene bisthiocyanate (MBT), isothiazolone, tetrakis (hydroxymethyl) phosphonium sulfate (THPS), 2,2-dibromo-3-nitrilopropioamide (DBNPA) the like, and any combination thereof.

Examples of asphaltene precipitation inhibitors may include, but are not limited to, dodecylphenol (DDPh), the like, and any combination thereof.

Examples of surfactants may include, but are not limited to, polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene glycol, polypropylene glycol, diethyl ene glycol, ethoxylated trimethylnonanols, polyoxyalkylene glycol modified polysiloxane surfactants, octyl trimethyl ammonium hydroxide, dodecyl trimethyl ammonium hydroxide, hexadecyl trimethyl ammonium hydroxide, octyl dimethyl benzyl ammonium hydroxide, decyl dimethyl benzyl ammonium hydroxide, didodecyl dimethyl ammonium hydroxide, dioctadecyl dimethyl ammonium hydroxide, tallow trimethyl ammonium hydroxide, coco trimethyl ammonium hydroxide, cetyl trimethyl ammonium chloride, cetyl pyridinium chloride, alkyl sulphates (e.g., lauryl sulphate), hexylbenzenesulfonic acid, octylbenzenesulfonic acid, decylbenzenesulfonic acid, dodecylbenzenesulfonic acid, cetylbenzenesulfonic acid, myristylbenzenesulfonic acid, the sulphate esters of monoalkyl polyoxyethylene ethers, alkylnapthylsulfonic acid, alkali metal sulfoccinates, sulfonated glyceryl esters of fatty acids (e.g., sulfonated monoglycerides of coconut oil acids), sodium octahydroanthracene sulfonate, alkali metal alkyl sulphates, ester sulphates, alkarylsulfonates, the like, and any combination thereof.

Examples of lubricants may include, but are not limited to, polyalpha olefins, synthetic esters, polyalkylene glycols, phosphate esters, perfluoropolyether, alkylated naphthalenes, silicate esters, ionic fluids, alkylated cyclopentanes (MAC), calcium stearate, epoxidized vegetable oils, epoxidized algal oil, epoxidized tallow, the like, and any combination thereof.

Examples of chelating agents may include, but are not limited to, ethylenediaminetetraacetic acid (EDTA), nitrilotriacetic acid, n-hydroxyethylethylenediaminetriacetic acid (HEDTA), citric acid, itaconic acid, aspartic acid, polyitaconic acid, polyaspartic acid, the like, and any combination thereof.

Examples of bacteria may include, but are not limited to, *Baccilus litchenforms, Leuconostoc mesenteroids, Xanthomonas compestris, Acinetobacter calcoacetiens, Arthrobacter paraffeninues, Baccilus* Sp., *Clostridium* Sp., *Pseudomonas* Sp., *Rhodococcus erythropolis, Mycobacterium* sp, the like, and any combination thereof.

Examples of fungi may include, but are not limited to *Torulopsis bombicola* sp, *Candida bombicola, Candida lipolytica, Candida ishiwadae, Candida batistae, Aspergillus ustus, Trichosporon ashii*, the like, and any combination thereof.

For example, deoxy ribonucleic acid (DNA) may contain base pairs between 50 and 5000 and may be derived from bacterial or mammalian origin.

For example, ribonucleic acid (RNA) may be obtained from RNA polymerase-mediated transcription from a linearized DNA template.

Methods of Producing Controlled Release Particles with Stimuli-Responsive Coatings The multi-urethane compound may be produced by any suitable synthetic routes. For example, the multi-urethane compound may be produced by first synthesizing a multi-urethane backbone by reacting an amine and a cyclic carbonate. In said methods, synthesis of the multi-urethane backbone does not use an isocyanate. The multi-urethane backbone may have a hydroxyl functionality, a carboxyl functionality, a thiol functionality, a vinyl functionality, or a combination thereof that may be utilized in the next step of the synthesis. In the second step, the multi-urethane backbone (via one or more of the foregoing functionalities) may be reacted with coupling compounds that provide the coupling moieties on the resultant multi-urethane compound that are capable of bonding to the surface of the porous particles (e.g., silanes for use with porous silica particles). The resultant product is the multi-urethane compound.

Figure 3A:
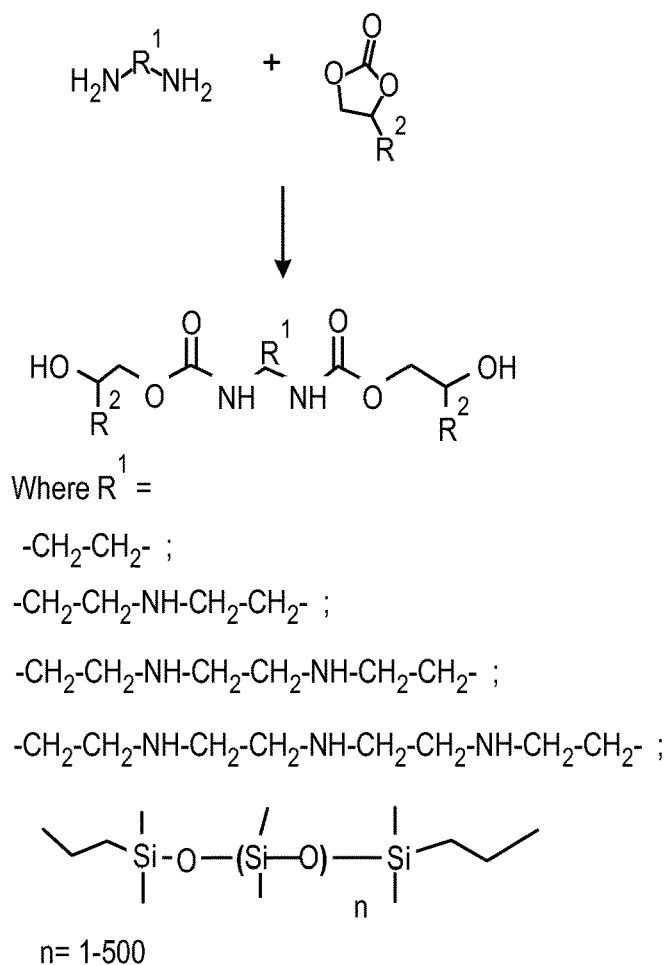
FIG. 3A illustrates a nonlimiting example reaction scheme for synthesizing a multi-urethane backbone.
Figure 3A:
Figure 3A:
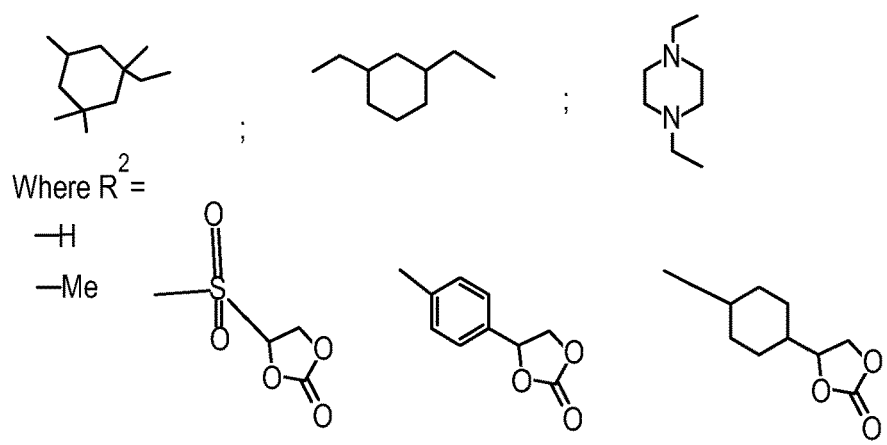
Figure 3B:
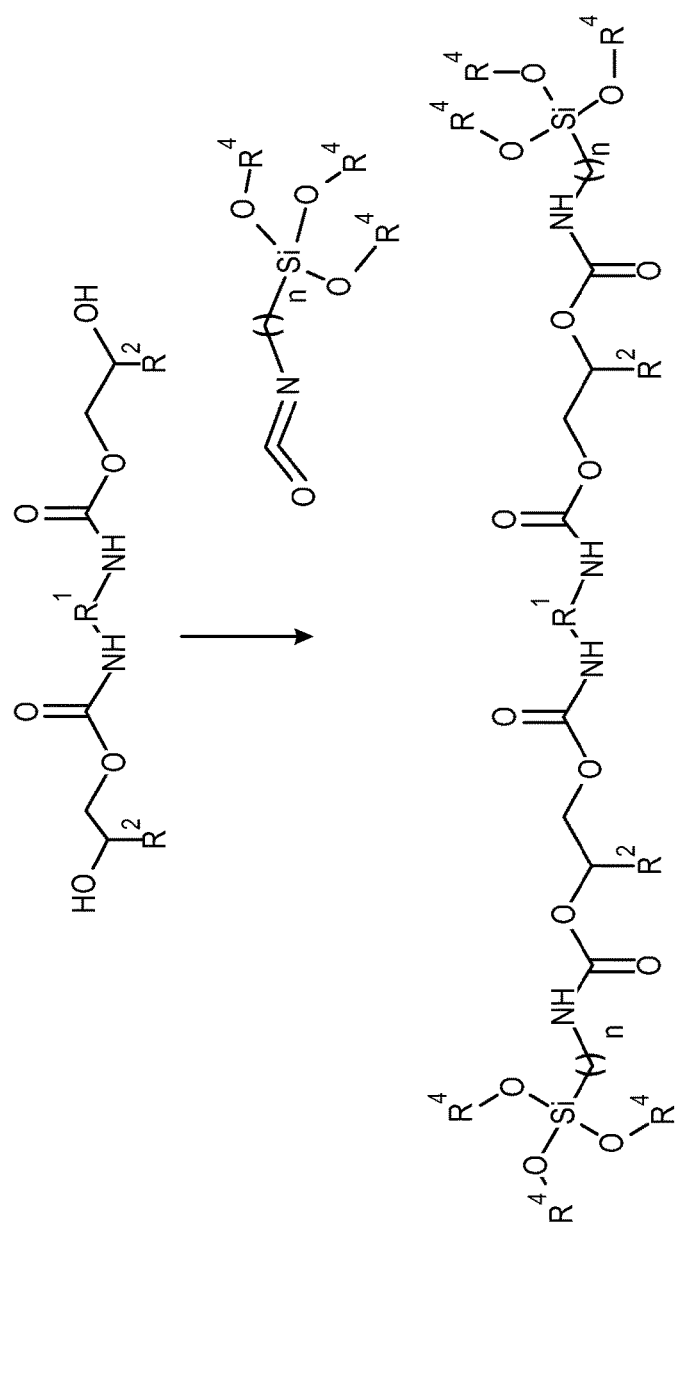
FIGS. 3B and 3C illustrate nonlimiting example reaction schemes for producing Compounds I and II, respectively, from the multi-urethane backbone of FIG. 3A.
Figure 3C:
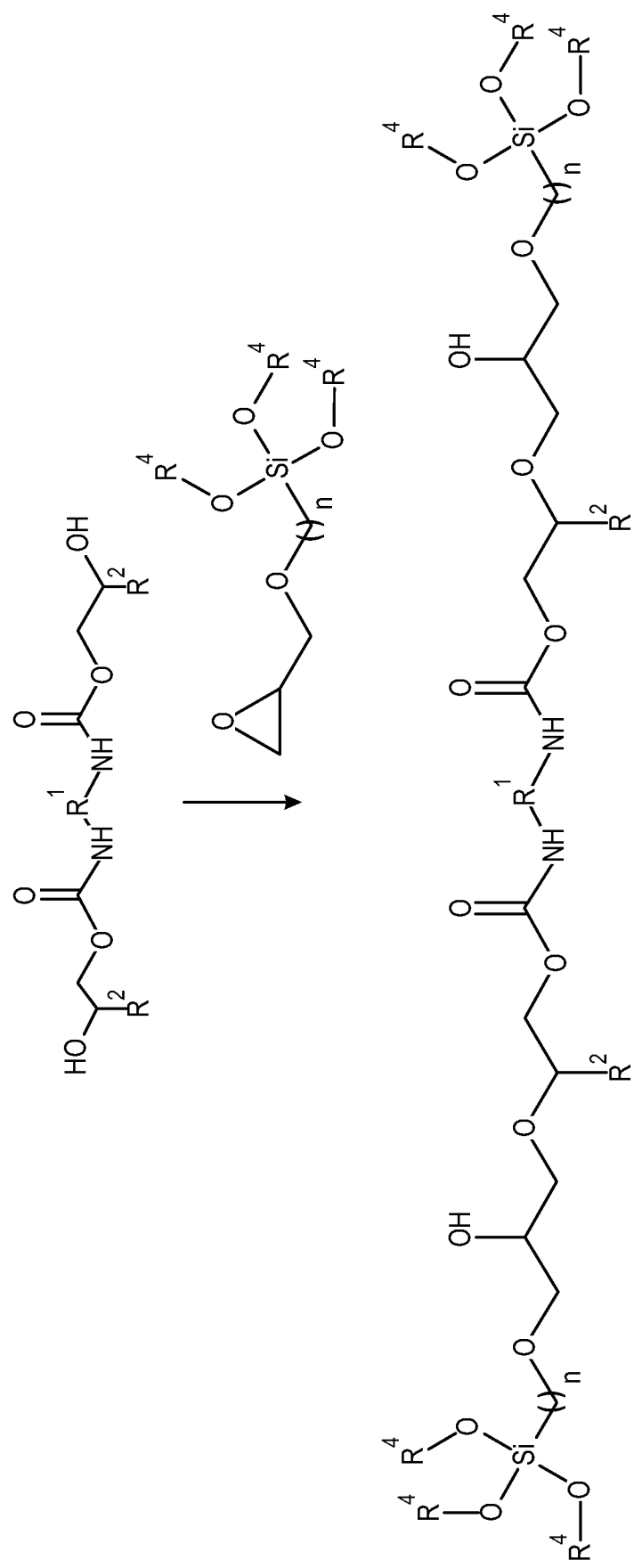

By way of nonlimiting example, FIG. 3A illustrates a reaction scheme for synthesizing the multi-urethane backbone of Compounds I and II. By way of further nonlimiting example, FIGS. 3B and 3C illustrate reaction schemes for producing Compounds I and II, respectively, from the multi-urethane backbone of FIG. 3A.

Reaction conditions for producing the multi-urethane backbone may include a temperature of about 35° C. to about 100° C. (or about 35° C. to about 60° C., or about 50° C. to about or about 70° C. to about 100° C.), a time of about 1 hour to about 24 hours (about 1 hour to about 12 hours, or about 8 hours to about 18 hours, or about 12 hours to about 24 hours). Further, the reaction to produce the multi-urethane backbone may be performed under an inert atmosphere (e.g., nitrogen, argon, and the like).

Examples of amines suitable for use in synthesizing the multi-urethane backbone may include, but are not limited to, ethylene diamine, diethylene triamine, triethylene tetramine, tetrethylene pentaamine, 4-(aminomethyl)octane-1,8-di amine, di aminopropyl terminated polydimethylsiloxane molecular weight above 300 and below 30,000, 2,6-diaminohexanoic acid (also referred as lysine), isophorone diamine, cyclohexyl diamine, hyperbranced amidoamine the like, and any combination thereof.

Examples of cyclic carbonates suitable for use in synthesizing the multi-urethane backbone may include, but are not limited to, ethylene carbonate, propylene carbonate, glycerol carbonate, styrene carbonate, cyclic carbonate derivatives derived from epoxidized vinyl monomers, glycidyl ether terminated polyols such as glycerine, ethylene glycol, propylene glycol, butylene glycol, trimethylol propane, pentaerythritol, sorbitol, sucrose, glucose, fructose trehalose, epoxidized vegetable oils, the like, and any combination thereof.

Reaction conditions for producing the multi-urethane compound (e.g., the reaction between the multi-urethane backbone and the coupling compounds) may include a temperature of about 35° C. to about 100° C. (or about 35° C. to about 60° C., or about 50° C. to about 80° C., or about to about 100° C.), a time of about 30 minutes to about 12 hours (about 30 minutes to about 12 hours, or about 1 hour to about 8 hours, or about 6 hours to about 12 hours). Further, the reaction to produce the multi-urethane backbone may be performed under an inert atmosphere (e.g., nitrogen, argon, and the like).

Examples of coupling compounds that yield the coupling moieties capable of covalently bonding to the surface of the porous particles may include, but are not limited to, tetraethyl orthosilicate, trimethoxy[2-(7-oxabicyclo[4.1.0]hept-3-yl)ethyl]silane, (3-aminopropyl)tris(trimethylsiloxy)silane, (3-glycidyl oxypropyl)tri ethoxysilane, 3-(triethoxysilyl)propyl isocyanate, titanium(IV) (triethanolaminato)isopropoxide, titanium(IV) bis(ammonium lactato)dihydroxide, titanium(IV) isopropoxide, titanium(IV) ethoxide, titanium(IV) isopropoxide, titanium(IV) 2-ethylhexyloxide, titanium(IV) oxyacetylacetonate zirconium(IV) ethoxide, zirconium(IV) isopropoxide, zirconium(IV) butoxide, zirconium(IV) acetylacetonate, the like, and any combination thereof.

The two reactions may be performed in separate vessels (e.g., producing the multi-urethane backbone, isolating the multi-urethane backbone, and producing the multi-urethane compound) or in the same vessel (e.g., producing the multi-urethane backbone and adding coupling compounds to produce the multi-urethane backbone).

The loading of the materials into the pores of the porous particles may be by any suitable method. For example, a concentrated solution or suspension of the material (e.g., about 65 parts to about 80 parts per 100 parts of solvent) may be slowly added to the porous particles (about 20 parts to about 35 parts) under agitation (e.g., using a paddle mixer or ribbon blender or bucket mixer or drum mixer) and dried to a final moisture content below 25 wt %, and preferably below 10 wt %. A weight ratio of the concentrated solution or suspension to the porous particles may be about 65:35 to about 80:20 (or about 65:35 to about 75:25, or about 70:30 to about 80:20).

The coating of the porous particles having materials therein with the multi-urethane compounds to produce the controlled release particles may be by any suitable method. For example, wet coating methods may be used. For example, the multi-urethane compounds may be dispersed in water and spray coated. Spray coating may be achieved using, for example, a fluidized bed Wurster coating process wherein the multi-urethane compound dispersion is sprayed from the bottom of the fluidized bed. The fluidized bed coater may be operated at an air flow in the range of about 2 standard cubic feet per minute (SCFM) to about 30 SCFM, a magnaflo pressure in the range of about 20 psi to about 80 psi, inlet temperature in the range of about 35° C. to about 90° C., a product temperature in the range of about 28° C. to about 65° C., an atomizing air pressure in the range of about 2 psi to about 30 psi, and a liquid dosage pump set at forward motion with a speed in the range of about 2 rpm to about 30 rpm. After completion of the spray process, the product may be allowed to dry to a final moisture content less than about 25 wt %, and preferably less than about 10 wt %.

In another wet coating method example, the porous particles having materials therein may be spray coated in a ribbon blender with the multi-urethane compounds at temperatures in the range of about 40° C. and about 90° C., at atmospheric pressure±3 psi, and for about 6 hours to facilitate the bonding of the multi-urethane compounds to the surface of the porous particles.

In yet another wet coating method example, the porous particles having materials therein may be coated with the multi-urethane compounds using a fluidized bed coater, wherein a water dispersion of multi-urethane compounds may be sprayed from the top of the fluidized bed. The fluidized bed coater may be operated at an air flow in the range of about 2 SCFM to about 30 SCFM, a magnaflo pressure set in the range of about 20 psi to about 80 psi, and an inlet temperature in the range of about 35° C. to about 90° C. After the completion of spray process the product may be allowed to dry to a final moisture content less than about 25 wt %, and preferable less than about wt %.

In yet another wet coating method example, the porous particles having materials therein may be dispersed in a solvent (e.g., acetone, ethanol, isopropanol, the like, and the combinations thereof). The multi-urethane compounds may be mixed with the dispersion in a reactor. The contents of the reactor may be mixed at a temperature in the range of about 30° C. to about 60° C. so that the solvents in the reactor evaporate (which may optionally be assisted by applying a vacuum) to yield the final product as a powder with a moisture (or solvent) content below about 10 wt %.

In yet another wet coating method example, the porous particles having materials therein may be dispersed in paraffin oil. The multi-urethane compounds may be mixed with the dispersion in a reactor. The contents of the reactor may be mixed at a temperature in the range of about 80° C. to about 100° C. under an inert atmosphere for about 4 hours to about 8 hours. The product may then be contacted with an excess of hexane and filtered to isolate the product. The product may be dried at room temperature to yield a powder with a moisture content below about wt %.

Independent of the production method, a weight ratio of porous particles having materials therein to multi-urethane compounds may be about 100:2 to about 100:50 (or about 100:2 to about 100:20, or about 100:10 to about 100:25, or about 100:15 to about 100:30, or about 100:25 to about 100:50).

The controlled release particles may be used as a solid additive (alone or in combination with other solid additives) and added to a fluid for a desired application.

Alternatively, the controlled release particles (alone or in combination with other solid additives) may be dispersed in a fluid to yield a slurry. The fluid of the slurry may be an aqueous fluid or an oil fluid. Examples of aqueous fluids may include, but are not limited to, fresh water, tap water, distilled water, deionized water, saltwater, and the like. Examples of oil fluids may include, but are not limited to, petroleum, kerosene, synthetic oil, paraffin, mineral oil, the like, and any combination thereof.

Oil and Gas Applications of Controlled Release Particles

The Compound I and/or controlled release particles described herein (e.g., controlled release particles comprising Compound I, controlled release particles with stimuli-responsive coatings comprising Compound I and/or another material) may be suitable for use as an additive in a fluid associated with a wellbore operation. Examples of wellbore operations may include, but are not limited to, a drilling operation, a stimulation operation, an acidizing operation, an acid-fracturing operation, a sand-control operation, a completion operation, a scale-inhibiting operation, a water-blocking operation, a clay-stabilizer operation, a fracturing operation, a propping operation, a gravel-packing operation, a wellbore-strengthening operation, a sag-control operation, the like, and any combination thereof.

A wellbore operation may comprise: introducing a controlled release particle with stimuli-responsive coatings described herein into a wellbore penetrating a subterranean formation; and exposing the controlled release particle to a stimuli so as to (a) transition the coating from a condensed state to an expanded state and (b) release at least a portion of the material from the pores of the porous particle. The method may further comprise: reversing and/or removing the stimuli so as to transition the coating from the expanded state to the condensed state. The exposure to the stimuli may occur prior to introduction into the wellbore, during introduction into the wellbore, while in the wellbore, while in the subterranean formation (if the controlled release particle penetrates into the subterranean formation), or any combination thereof. The reversal and/or removal of the stimuli occurs after exposure of the stimuli and may occur prior to introduction into the wellbore, during introduction into the wellbore, while in the wellbore, while in the subterranean formation (if the a controlled release particle penetrates into the subterranean formation), or any combination thereof. The steps of (a) exposing the stimuli and (b) reversing and/or removing the stimuli may be repeated one or more times.

By way of nonlimiting example, an acidizing operation may comprise: introducing a controlled release particle with stimuli-responsive coatings described herein into a wellbore penetrating a subterranean formation, wherein the material comprises a scale inhibitor and/or a corrosion inhibitor; exposing the controlled release particle to a stimuli (e.g., an increase in temperature as a result of being downhole) so as to (a) transition the coating from a condensed state to an expanded state and (b) release at least a portion of the material from the pores of the porous particle; and mitigating scale formation on and/or corrosion of downhole wellbore tools (e.g., tubulars).

Example Embodiments

Embodiment 1. A composition comprising: a porous particle; a material in pores of the porous particle; and a coating bonded to a surface of the porous particle, wherein the coating comprises a multi-urethane compound capable of reversibly converting between a condensed state and an expanded state upon exposure to a stimuli.

Embodiment 2. The composition of any preceding Embodiment, wherein the porous particle comprises one or more of: a porous carbon particle, a porous silica particle, a porous natural mineral, and a porous synthetic mineral.

Embodiment 3. The composition of any preceding Embodiment, wherein the porous particle has a $N_2$ BET surface area of about 100 m$^2$/g or greater.

Embodiment 4. The composition of any preceding Embodiment, wherein the porous particle has a weight average diameter of about 10 nm to about 2000 μm.

Embodiment 5. The composition of any preceding Embodiment, wherein the material comprises one or more of: a small molecule, a bacteria, and a yeast.

Embodiment 6. The composition of Embodiment 5, wherein the small molecule comprises one or more of: a scale inhibitor, a corrosion inhibitor, an asphaltene precipitation inhibitor, a surfactant, a lubricant, and a chelating agent.

Embodiment 7. The composition of Embodiment 1, wherein the multi-urethane compound comprises a bis-silane, multi-urethane compound; a bis-titanate, multi-urethane compound; a bis-zirconate, multi-urethane compound; a bis-vanadate, multi-urethane compound; a silane, titanate, multi-urethane compound; a silane, zirconate, multi-urethane compound; a silane, vanadate, multi-urethane compound; a titanate, zirconate, multi-urethane compound; a titanate, vanadate, multi-urethane compound; a zirconate, vanadate, multi-urethane compound; or any combination thereof.

Embodiment 8. The composition of any preceding Embodiment, wherein the multi-urethane compound comprises two or more coupling moieties comprising one or more of: a hydroxyl, an amine, a silane, a titanate, a zirconate, and a vanadate.

Embodiment 9. The composition of any preceding Embodiment, wherein the multi-urethane compound comprises Compound III and/or Compound IV.

Embodiment 10. The composition of any preceding Embodiment, wherein the stimuli comprises one or more of: an increase in temperature, an increase in pH, an increase in ionic strength, an application of UV light, a presence of an enzyme, and a presence of a microbial organism.

Embodiment 11. A method comprising: introducing the controlled release particle of any preceding Embodiment into a wellbore penetrating a subterranean formation; and exposing the controlled release particle to a stimuli so as to (a) transition the coating from a condensed state to an expanded state and (b) release at least a portion of the material from the pores of the porous particle.

Embodiment 12. The method of Embodiment 11 further comprising: reversing and/or removing the stimuli so as to transition the coating from the expanded state to the condensed state.

Embodiment 13. The method of one of Embodiments 11-12, wherein the method is a portion of a wellbore operation selected from the group consisting of: a drilling operation, a stimulation operation, an acidizing operation, an acid-fracturing operation, a sand-control operation, a completion operation, a scale-inhibiting operation, a water-blocking operation, a clay-stabilizer operation, a fracturing operation, a propping operation, a gravel-packing operation, a wellbore-strengthening operation, a sag-control operation, the like, and any combination thereof.

Embodiment 14. A method comprising: reacting an amine and a cyclic carbonate to produce a multi-urethane backbone; reacting the multi-urethane backbone with a coupling compound to yield a multi-urethane compound comprising the multi-urethane backbone and two or more coupling moieties capable of bonding to a surface of a porous particle; bonding the multi-urethane compound to the surface of the porous particle; and loading pores of the porous particle with an material.

Embodiment 15. The method of Embodiment 14, wherein the amine is selected from the group consisting of: ethylene diamine, isophorone diamine, cyclohexyl diamine, and any combination thereof.

Embodiment 16. The method of one of Embodiments 14-15, wherein the cyclic carbonate is selected from the group consisting of: ethylene carbonate, propylene carbonate, glycerol carbonate, styrene carbonate, cyclic carbonate derivatives derived from epoxidized vegetable oils, and any combination thereof.

Embodiment 17. The method of one of Embodiments 14-16, wherein the coupling compound is selected from the group consisting of: tetraethyl orthosilicate, trimethoxy[2-(7-oxabicyclo[4.1.0]hept-3-yl)ethyl]silane, (3-aminopropyl) tri s(trimethyl siloxy)silane, (3-glycidyloxypropyl)triethoxysilane, 3-(tri ethoxysilyl)propyl isocyanate, titanium(IV) (triethanolaminato)isopropoxide, titanium(IV) bis(ammonium lactato)dihydroxide, titanium(IV) isopropoxide, titanium(IV) ethoxide, titanium(IV) isopropoxide, titanium(IV) 2-ethylhexyloxide, titanium(IV) oxyacetylacetonate zirconium(IV) ethoxide, zirconium(IV) isopropoxide, zirconium (IV) butoxide, zirconium(IV) acetylacetonate, and any combination thereof.

Embodiment 18. The method of one of Embodiments 14-17, wherein the step of bonding the multi-urethane compound to the surface of the porous particle occurs after the step of loading the pores of the porous particle with the material.

Embodiment 19. The method of one of Embodiments 14-18, wherein the porous particle comprises one or more of: a porous carbon particle, a porous silica particle, a porous natural mineral, and a porous synthetic mineral.

Embodiment 20. The method of one of Embodiments 14-19, wherein the porous particle has a $N_2$ BET surface area of about 100 m$^2$/g or greater.

Embodiment 21. The method of one of Embodiments 14-20, wherein the porous particle has a weight average diameter of about 10 nm to about 2000 μm.

Embodiment 22. The method of one of Embodiments 13-21, wherein the material comprises one or more of: a small molecule, a bacteria, and a yeast.

Embodiment 23. The method of Embodiment 22, wherein the small molecule comprises one or more of: a scale inhibitor, a corrosion inhibitor, an asphaltene precipitation inhibitor, a surfactant, a lubricant, and a chelating agent.

Embodiment 24. The method of one of Embodiments 14-23, wherein the multi-urethane compound comprises a bis-silane, multi-urethane compound; a bis-titanate, multi-urethane compound; a bis-zirconate, multi-urethane compound; a bis-vanadate, multi-urethane compound; a silane, titanate, multi-urethane compound; a silane, zirconate, multi-urethane compound; a silane, vanadate, multi-urethane compound; a titanate, zirconate, multi-urethane compound; a titanate, vanadate, multi-urethane compound; a zirconate, vanadate, multi-urethane compound; or any combination thereof.

Embodiment 25. The method of one of Embodiments 14-24, wherein the two or more coupling moieties comprise one or more of: a hydroxyl, an amine, a silane, a titanate, a zirconate, and a vanadate.

Embodiment 26. The method of one of Embodiments 14-25, wherein the multi-urethane compound comprises Compound III and/or Compound IV.

Embodiment 27. A composition comprising: Compound I.

Embodiment 28. The composition of Embodiment 27, wherein the bivalent metal cation is selected from the group consisting of: zinc, nickel, cadmium, and manganese.

Embodiment 29. A composition comprising: a porous particle; and Compound I absorbed in pores of the porous particle.

Embodiment 30. The composition of Embodiment 29, wherein the bivalent metal cation is selected from the group consisting of: zinc, nickel, cadmium, and manganese.

Embodiment 31. The composition of Embodiment 29 or Embodiment 30 further comprising a nonporous particle.

Embodiment 32. A method comprising: introducing a wellbore fluid into a wellbore penetrating a subterranean formation, wherein the wellbore fluid comprising the composition of any one of Embodiments 27-31.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the incarnations of the present inventions. At the very least, and not as an attempt to limit the application of the doctrine of equivalents to the scope of the claim, each numerical parameter should at least be construed in light of the number of reported significant digits and by applying ordinary rounding techniques.

One or more illustrative incarnations incorporating one or more invention elements are presented herein. Not all features of a physical implementation are described or shown in this application for the sake of clarity. It is understood that in the development of a physical embodiment incorporating one or more elements of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While compositions and methods are described herein in terms of "comprising" various components or steps, the compositions and methods can also "consist essentially of" or "consist of" the various components and steps.

To facilitate a better understanding of the embodiments of the present invention, the following examples of preferred or representative embodiments are given. In no way should the following examples be read to limit, or to define, the scope of the invention.

Examples

Example 1 (Control). About 300 grams of HI-SIL® 213 (porous silica particles, available from PPG Industries, Inc.) in a one-liter plastic jar was stirred. Slowly, about 558 grams of LFS 311 (an iron scale inhibitor, available from by LFS Chemicals) was added to the mixer over a period of about 45 minutes with continuous stirring at about 500 rpm. The resultant product was a free-flowing powder with density of about 0.7 g/mL to about 0.8 g/mL.

Example 2 (Control). About 780 grams of HI-SIL® 213 and about 1448 grams of LFS 311 (an iron scale inhibitor, available from by LFS Chemicals) were sprayed into a Wurster type fluidized bed vessel from the bottom of the fluidized bed. The fluidized bed coater was operated at an air flow of about 12 SCFM, magnaflo pressure of about 30 psi, an inlet temperature of about a product temperature of about 40° C., an atomizing air pressure of about 12 psi, and a liquid dosage pump set at forward motion with a speed of about 20 rpm. After the completion of the spray process, the product was allowed to dry to a final moisture content less than about 10 wt %.

Example 3 (Control, Prophetic). About 1.5 kg of HI-SIL® 213 are charged in a one-cubic-foot Ribbon blender. While the ribbon blender is on, about 2.8 kg of LFS 311 is sprayed into the blender slowly over a period of about 45 minutes. The product formed is expected to be a free-flowing powder with density of about 0.7 g/mL to about 0.8 g/mL.

Example 4 (Inventive). In a first step, multi-urethane backbones were produced. First, a cyclic carbonate (ethylene carbonate or propylene carbonate) (amounts according to Table 1) was added to, stirred at about 300 rpm, and heated in a round bottom flask purged with nitrogen. Once the temperature reached 40° C., a diamine compound (isophorone diamine) was added (amount according to Table 1) very slowly to the flask over a period of about 4 hours. After addition of the diamine compound was completed, the temperature was increased to about 80° C. and allowed to continue the reaction for about 2 more hours. The multi-urethane backbone (MUB) product was poured onto an aluminum tray and cooled to room temperature to form a solid product.

TABLE 1

| Components | MUB 4A | MUB 4B |
|---|---|---|
| ethylene carbonate (g) | 264 | 0 |
| propylene carbonate (g) | 0 | 3024 |
| isophorone diamine (g) | 251 | 251 |

In a second step, MUB 4A or MUB 4B (amounts according to Table 2), coupling compounds (compositions and amounts according to Table 2), and solvents was added to a 500 mL round bottom flask purged with nitrogen, stirred at about 300 rpm, and heated to 60° C. Once the temperature of the mixture reached 60° C., the reaction was allowed to continue for about 6 hours. The products were multi-urethane compounds (MUC).

TABLE 2

| Components | MUC 4B | MUC 4C | MUC 4D | MUC 4E | MUC 4F |
|---|---|---|---|---|---|
| MUB 4A (g) | 63.9 | 0 | 0 | | |
| MUB 4B (g) | 0 | 64.5 | 60.3 | 64.5 | 64.5 |
| 3-(triethoxysilyl) propyl isocyanate (g) | 91.2 | 85.5 | 0 | 43 | 0 |
| (3-glycidyloxypropyl) triethoxysilane (g) | 0 | 0 | 90 | 0 | 45 |
| tetraethyl orthosilicate (g) | 0 | 0 | 0 | 30 | 30 |
| acetone (g) | 60 | 60 | 60 | 0 | 0 |

Example 5 (Inventive). With amounts and compositions according to Table 3, MUC 4C was slowly (over a period of about 5 minutes) added to and mixed with a polymeric binder in 500 mL plastic jars using a laboratory mixer to assess compatibility between multi-urethane compounds and polymeric binders.

TABLE 3

| Components | Example 5A | Example 5B | Example 5C | Example 5D |
|---|---|---|---|---|
| MUC 4C (g) | 75 | 75 | 75 | 75 |
| styrene butadiene emulsion (g) | 225 | 0 | 0 | 0 |
| styrene acrylic emulsion (g) | 0 | 225 | 0 | 10 |
| acrylic emulsion (g) | 0 | 0 | 225 | 0 |
| furan resin/furfuryl alcohol blend (prophetic) (g) | 0 | 0 | 0 | 225 |

The formulations resulted in a gel-free, homogeneous solutions that were stable up to about 30 days (based on visual examination) when stored at room temperature (e.g., less than 28° C.). This observation demonstrates the MUC's are compatible with commercial polymeric binders.

Example 5 (Inventive). About 300 grams of HI-SIL® 213 having density of about 0.23 g/mL to about 0.26 g/mL was placed in a one-liter plastic jar and stirred. Slowly about 558 grams of LFS 311 was added to the jar over a period of about 45 minutes with continuous stirring at about 500 rpm. The product formed was a free-flowing powder with density of about 0.7 g/mL to about g/mL.

About 150 grams of the free-flowing powder product added to a separate plastic jar and stirred. Using a PREVAL sprayer, about 75 grams of Example 5C product was slowly sprayed into the jar over a period of about 45 minutes with continuous stirring at about 500 rpm. The product was transferred into a glass tray and kept in an oven at about 80° C. for about 40 minutes to obtain a free-flowing powder with density of about 0.6 g/mL.

Example 6 (Inventive). About 300 grams of product from Example 2 was added to a Wurster-type fluidized bed vessel and sprayed with about 300 grams of Example 5C product from the bottom of the fluidized bed. The fluidized bed coater was operated at an air flow of about 12 SCFM, a magnaflo pressure of about 30 psi, an inlet temperature of about 80° C., a product temperature of about 40° C., an atomizing air pressure of about 12 psi, and a liquid dosage pump set at forward motion with a speed of about 20 rpm. After the completion of spray process, the product was allowed to dry to a final moisture content less than about 10 wt % to obtain a free-flowing powder with density of about 0.5 g/mL.

Example 7 (Inventive). About 100 grams of HI-SIL® 213 was added to a one-liter plastic jar and mixed. About 186 grams of LFS 311 was slowly added over a period of about 45 minutes with continuous stirring at about 500 rpm. The product formed was a free-flowing powder with density of about 0.8 g/mL. The product obtained was transferred to a glass tray and placed in an oven at about 100° C. for about 1 hour. The dried product (about 50 grams) was added to a 500 mL glass reactor and charged with about 250 grams of HYPRENE™ P40 (paraffinic oil, available from Ergon). The reactor was placed on an oil bath and the contents were stirred at about 500 rpm. The contents were heated to about 60° C. Once the temperature was reached, a mixture of about 30 grams of MUB 4B and about 50 grams of acetone was slowly added to the reactor. After about 15 minutes of mixing, about 2.5 grams of 3-(triethoxysilyl)propyl isocyanate was added to the reactor and allowed to react for about 1 hour. Then, about 6.25 grams of 2,4-toluene diisocyante was added to the reactor and allowed to continue the reaction for about an additional 6 hours. The product obtained was isolated by decanting the top liquid layer, adding 50 mL of hexane, decanting the top liquid layer, and allowing the product to dry at room temperature for 16 hours. The product was a free-flowing powder.

Example 8 (Inventive)—Release studies at room temperature. About 2 grams of sample (an inventive sample (Example 7) and a control sample (Example 1), separately) was mixed with about 100 mL of distilled water with mechanical shaking for about 2 minutes. Then, the mixture was filtered using a Buchner funnel containing a quantitative filter paper. The retained solids were mixed with another 100 mL of distilled water with mechanical stirring for about 2 minutes and set aside. This was repeated multiple times at specified time intervals (see FIG. 4 data points) where the filtrate was used to assess the amount of scale inhibitor released by each sample.

In a separate volumetric flask, about 50 mL of the filtrate was collected. The filtrated was titrated with 1% NaOH using a phenolphthalein indicator to a pale permanent pink end point. The amount of scale inhibitor released was calculated using the following formula.

$$\text{Scale inhibitor released}(\%) = \frac{\text{Actual volume of NaOH consumed(mL)}}{\text{Theoretical volume of NaOH consumed}} \times 100$$

Figure 4:
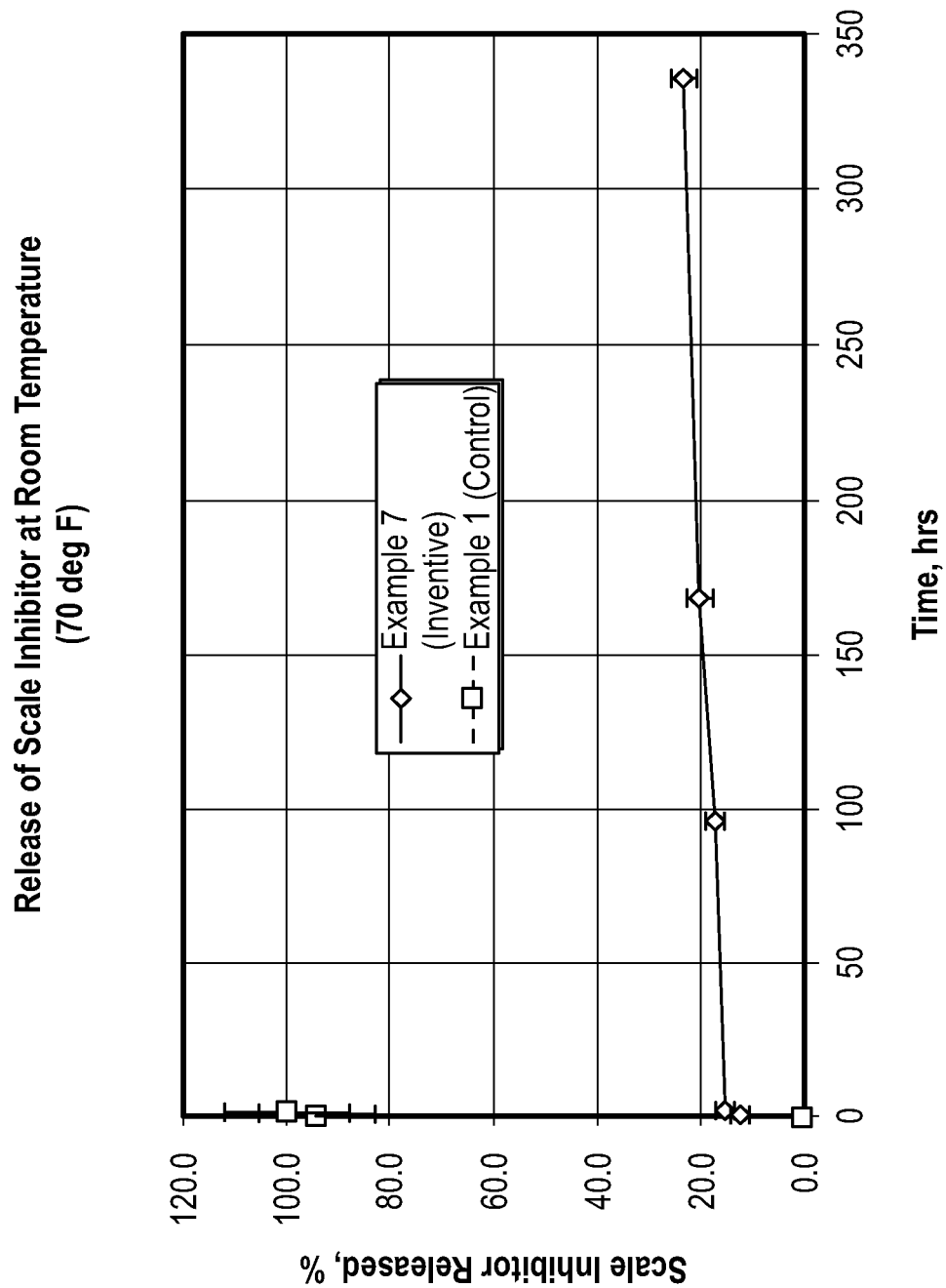
FIG. 4 illustrates the scale inhibitor release data from comparative and inventive particles at room temperature.

The amount of scale inhibitor released at about 70° F. for each of the inventive samples and the control sample are illustrated in FIG. 4. The control sample released all of the loaded scale inhibitor within about 2 hours of exposure, whereas, the inventive sample released about 20% of the loaded scale inhibitor after 336 hours of exposure. The data demonstrates that inventive MUC (Example 7) effectively seal the pores and prevents the leakage of the scale inhibitor from the substrate.

Example 9 (Inventive)—Release studies at room 160° F. The procedure of Example 8 was followed except that between each water washing and filtering, the samples were stored in an oven at about 160° F. Upon removal from the oven, the samples were allowed to cool to room temperature before washing and filtering.

Figure 5:
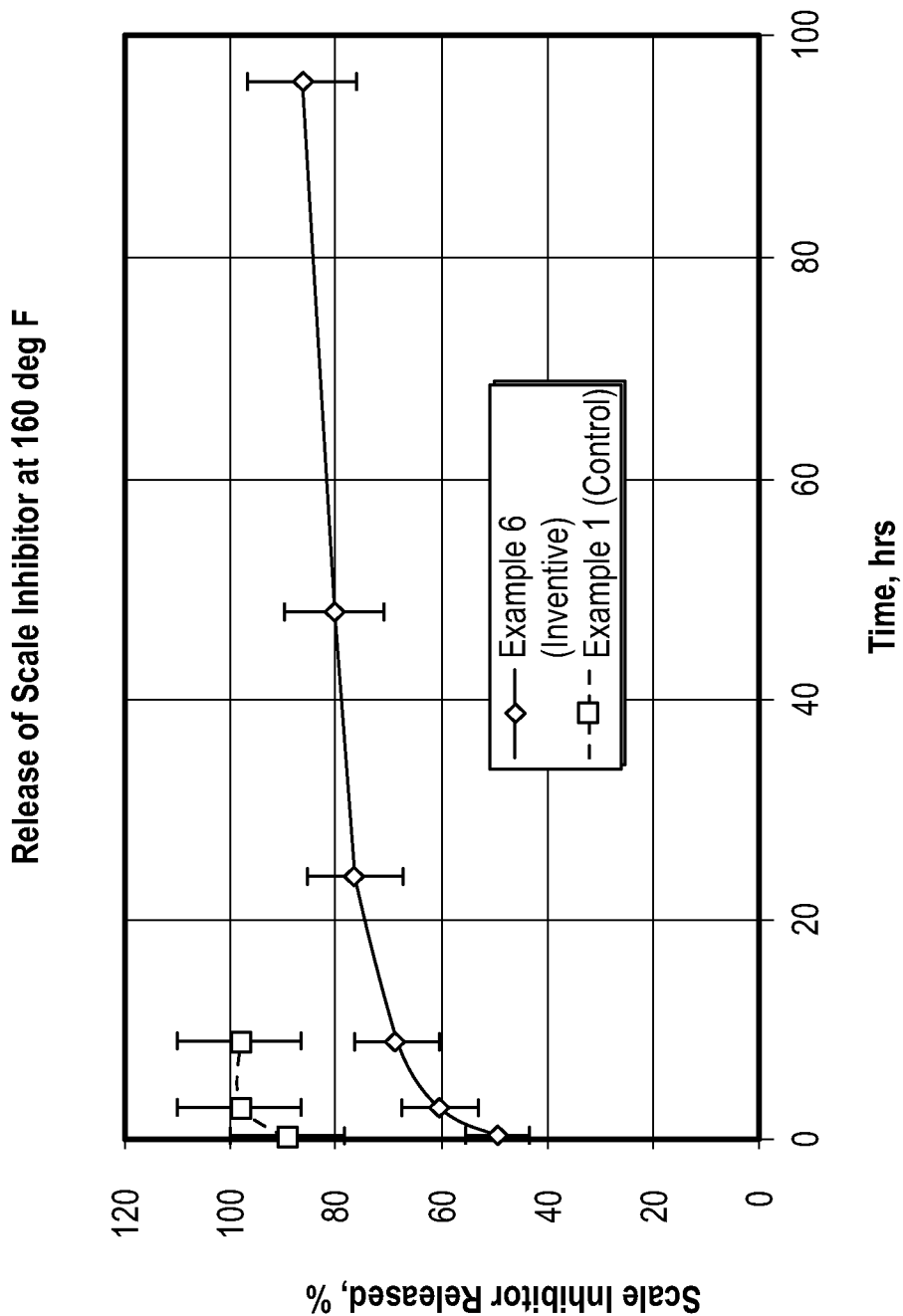
FIG. 5 illustrates the scale inhibitor release data from comparative and inventive particles at about 160° F.

FIG. 5 illustrates the scale inhibitor release data. Generally, the control sample released all of the loaded scale inhibitor within about 1 hour of exposure; whereas, the inventive sample released about 80% of the loaded scale inhibitor after 96 hours of exposure. The data demonstrates that inventive MUC effectively seal the pores and released the scale inhibitor from the porous particles at elevated temperatures.

Example 10 (Inventive) Synthesis of Pentazinc; [bis[2-[bis(phosphonomethyl)amino]ethyl]amino]methylphosphonic acid. About 40 g of zinc acetate dihydrate was added slowly (about 5 g at a time) to 100 mL of distilled water at 45° C. After dissolution of the zinc acetate dihydrate, the zinc acetate dihydrate solution was mixed with 40 g of diethylenetriaminepenta(methylenephosphonic acid) (supplied as 50 w/v % in water). The mixture was stirred for 15 minutes then allowed to sit undisturbed for 1 hour. The fluid of the resulting mixture was decanted, and the remaining precipitate was washed with water (6 times with 200 mL of water each wash) until the wash water was neutral (per litmus paper). The precipitate was then dried in a vacuum oven at 120° C. for 24 hours. Nuclear magnetic resonance spectroscopy, Fourier-transform infrared spectroscopy, and other analytical techniques were used to confirm the product structure was that of Compound I.

Example 11 (Inventive) Synthesis of Pentazinc; [bis[2-[bis(phosphonomethyl)amino]ethyl]amino]methylphosphonic acid. About 25 g of zinc chloride was added slowly (about 5 g at a time) to 30 mL of distilled water. After dissolution of the zinc chloride, the zinc chloride solution was mixed with 40 g of diethylenetriaminepenta(methylenephosphonic acid) (supplied as 50 w/v % in water). The mixture was stirred for 15 minutes then allowed to sit undisturbed for 1 hour. The resulting product was added to 500 mL of distilled water where a white precipitate formed and was allowed to settle for minutes. The fluid was decanted, and the remaining precipitate was washed with water (6 times with 200 mL of water each wash) until the wash water was neutral (per litmus paper). The precipitate was then dried in a vacuum oven at 120° C. for 24 hours. Nuclear magnetic resonance spectroscopy, Fourier-transform infrared spectroscopy, and other analytical techniques were used to confirm the product structure was that of Compound I.

Example 12 (Inventive)—Production of a solid scale inhibitor comprising Pentazinc; [bis[2-[bis(phosphonomethyl)amino]ethyl]amino]methylphosphonic acid and nonporous particles. About 3.3 lbs of zinc acetate dihydrate were slowly added (about 25-50 g per addition) to 1 gallon of tap water at room temperature. The resulting solution was mixed with about gallons of diethylenetriaminepenta(methylenephosphonic acid) (supplied as 50 w/v % in water). A white precipitate was formed. The mixture was mixed for an additional 15 minutes then allowed to sit undisturbed for 1 hour. The fluid was decanted. About 4.95 lbs of sand was added slowly to the precipitated solid and mechanically stirred. The sand absorbs the remaining water present in the precipitate. The resulting slurry was allowed to dry in an air circulatory oven at 90° C. where mixing occurred occasionally to facilitate drying.

Example 13 (Inventive)—Production of a solid scale inhibitor comprising Pentazinc; [bis[2-[bis(phosphonomethyl)amino]ethyl]amino]methylphosphonic acid and a mixture of porous and nonporous particles. Example 12 was repeated except with a mixture of about 3 lbs of sand and 1.95 lbs of HI-SIL® 213 rather than about 4.95 lbs of sand.

Example 14 (Control). About 35 grams of HI-SIL® 213 was mixed with about 65 grams of diethylenetriaminepenta (methylenephosphonic acid) (supplied as 50 w/v % in water) for about 30 minutes.

Example 15—Controlled Release Testing.

Static release procedure:
1. 2 g of solids (see Table 4) were added to 100 g of distilled water.
2. Samples were allowed to sit for 24 hours at an elevated temperature (see Table 4).
3. Solids were filtered out of the fluid using a 45 µm filter.
   a. Solids were then transferred to a new container and 100 g of distilled water were added.
   b. Fluid sample collected was prepared for ICP (inductively coupled plasma) mass spectrometry.
      i. Phosphorous in the fluid was detected and phosphate residuals were determined.
      ii. 3.066×[phosphorous]=$PO_4$ residual concentration
4. Step C was repeated at the following time intervals (total exposure hours)
   a. 48 hours and 96 hours The static release results are presented in Table 4.

TABLE 4

| | Concentration of Residual $PO_4$ | | |
|---|---|---|---|
| Hours | Example 14 Control at 75° F. | Inventive Example 13 at 75° F. | Inventive Example 13 150° F. |
| 0 | 0 | 0 | 0 |
| 24 | 50,842 | 1,097 | 1,038 |
| 48 | 4,576 | 604 | 530 |
| 96 | 961 | 401 | 307 |

The static tests suggest that the scale inhibitor continues to be released into fluid phase after 96 hours of exposure.

Dynamic release procedure:
1. Test columns was packed with a mixture of 100 mesh sand and the solid sample (Table 6) according to 2% solids (12.8 g) and sand (640 g).
2. The test fluid was heated to a test temperature of 150° F., and heating was maintained for duration of test.
3. Column fluid volume=200 mL (1 Pore Volume or PV)
4. Fluid was flowed through the column at a rate of 1 PV per 2.00 minutes.
5. Effluent samples were collected at the start of each pore volume.
   a. Samples were collected at 1, 2, 3, 4, 5, 10, 15, 20, 25, 50, 100, 200, 500, 1000 PVs (Table 5).
6. Each effluent sample collected was prepared for ICP (inductively coupled plasma) mass spectrometry.
   a. Phosphorous in the fluid was detected and phosphate residuals were determined.
   b. 3.066× [phosphorous]=$PO_4$ residual concentration

TABLE 5

| Pore Volume | Total Volume of Water (gal) | Minutes |
|---|---|---|
| 0 | 0.00 | 0 |
| 1 | 0.05 | 2 |
| 2 | 0.11 | 4 |
| 3 | 0.16 | 6 |
| 4 | 0.21 | 8 |
| 5 | 0.26 | 10 |
| 10 | 0.53 | 20 |
| 25 | 1.32 | 50 |
| 50 | 2.64 | 100 |
| 75 | 3.96 | 150 |
| 100 | 5.29 | 200 |
| 250 | 13.21 | 500 |
| 500 | 26.43 | 1000 |
| 800 | 42.28 | 1600 |
| 1000 | 52.85 | 2000 |

TABLE 6

| Pore Volume | Inventive Example 12 | Pore Volume | Inventive Example 13 |
|---|---|---|---|
| 1 | 118986.74 | 1 | 936.63 |
| 2 | 9405.85 | 2 | 600.77 |
| 3 | 4390.44 | 3 | 348.36 |
| 4 | 2111.56 | 4 | 237.89 |
| 5 | 1514.82 | 5 | 184.67 |
| 10 | 378.2 | 10 | 111.69 |
| 25 | 64.51 | 25 | 45.96 |
| 250 | 26.21 | 150 | 40.32 |
| 404 | 10.08 | | |
| 555 | 2.42 | | |

The dynamic tests showed the delayed release of scale inhibitor.

Therefore, the present invention is well adapted to attain the ends and advantages mentioned as well as those that are inherent therein. The particular examples and configurations disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative examples disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

The invention claimed is:

1. A composition comprising:
a porous particle;
a material in pores of the porous particle; and
a coating bonded to a surface of the porous particle,
wherein the coating comprises a multi-urethane compound capable of reversibly converting between a condensed state and an expanded state upon exposure to a stimuli,
wherein the multi-urethane compound comprises Compound III and/or Compound IV Compound III

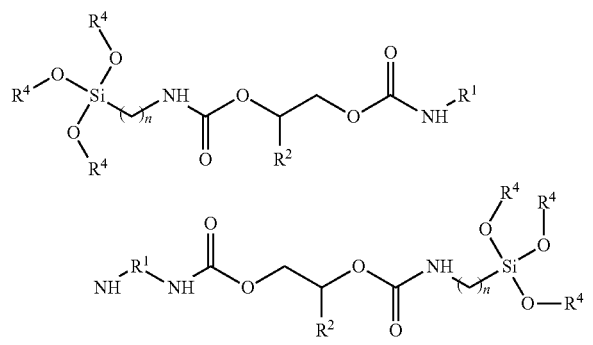

Compound IV

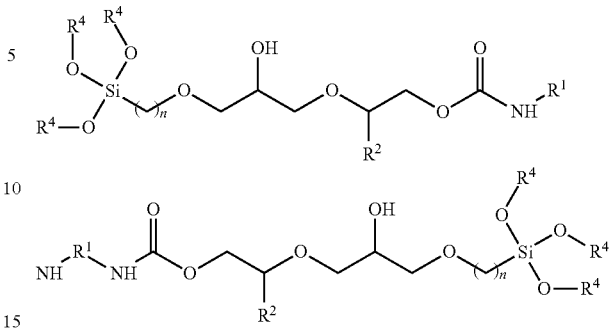

where n=1-12;
$R^1$=—$CH_2$—$CH_2$—, —$CH_2$—$CH_2$—NH—$CH_2$—$CH_2$—, —$CH_2$—$CH_2$—NH—$CH_2$—$CH_2$—NH—$CH_2$—$CH_2$—, —$CH_2$—$CH_2$—NH—$CH_2$—$CH_2$—NH—$CH_2$—$CH_2$—NH—$CH_2$—$CH_2$—,

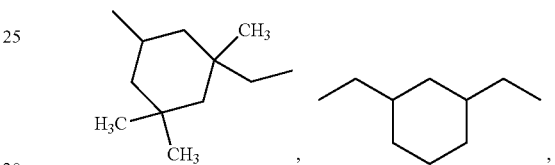

or

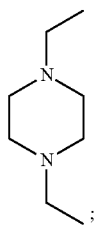

$R^2$=hydrogen or methyl; and
$R^4$=methyl, ethyl, i-propyl, or t-butyl.

2. The composition of claim 1, wherein the porous particle has a $N_2$ BET surface area of about 100 $m^2/g$ or greater.

3. The composition of claim 1, wherein the porous particle has a weight average diameter of about 10 nm to about 2000 μm.

4. The composition of claim 1, wherein the porous particle comprises one or more of a porous carbon particle, a porous silica particle, a porous natural mineral, or a porous synthetic mineral.

5. The composition of claim 1, wherein the material comprises one or more of a small molecule, a bacteria, or a yeast.

6. The composition of claim 5, wherein the material comprises a small molecule, and the small molecule comprises one or more of a scale inhibitor, a corrosion inhibitor, an asphaltene precipitation inhibitor, a surfactant, a lubricant, or a chelating agent.

7. The composition of claim 6, wherein the small molecule comprises a scale inhibitor, and the scale inhibitor comprises one or more of pentazinc; [bis[2-[bis(phosphonomethyl)amino]ethyl]amino]methylphosphonic acid, pentanickel; [bis[2-[bis(phosphonomethyl)amino]ethyl]amino] methylphosphonic acid, pentacadmium; [bis[2-[bis (phosphonomethyl)amino]ethyl]amino]methylphosphonic acid, pentamanganese; [bis[2-[bis(phosphonomethyl) amino]ethyl]amino]methylphosphonic acid, nitrilotri(methylphosphonic acid), n,n-bis(phosphonomethyl)glycine, iminodi(methylphosphonic acid), (aminomethyl)phosphonic acid, methylenediphosphonic acid, diethylenetriaminepentakis(methylphosphonic acid), 2-hydroxyethyl imino bis(methylene)) bisphosphonic acid, amino-tris(methylenephosphonate), poly(vinyl phosphonic acid), sulfo succinic acid, benzene sulfonic acid, naphthalene sulfonic acid, vinyl sulfonic acid, poly vinyl sulfonic acid, styrene sulfonic acid, polystyrene sulfonic acid, ethylenediaminetetraacetic acid (EDTA), nitrilotriacetic acid, polyacrylic acid, or any combination thereof.

8. The composition of claim 1, wherein the stimuli comprises one or more of an increase in temperature, an increase in pH, an increase in ionic strength, an application of UV light, a presence of an enzyme, or a presence of a microbial organism.

9. A method comprising:
introducing the composition of claim 1 into a wellbore penetrating a subterranean formation; and
exposing the controlled release particle to a stimuli so as to (a) transition the coating from a condensed state to an expanded state and (b) release at least a portion of the material from the pores of the porous particle.

10. The method of claim 9 further comprising:
reversing and/or removing the stimuli so as to transition the coating from the expanded state to the condensed state.

11. The method of claim 9, wherein the method is a portion of a wellbore operation selected from the group consisting of a drilling operation, a stimulation operation, an acidizing operation, an acid-fracturing operation, a sand-control operation, a completion operation, a scale-inhibiting operation, a water-blocking operation, a clay-stabilizer operation, a fracturing operation, a propping operation, a gravel-packing operation, a wellbore-strengthening operation, a sag-control operation, and any combination thereof.

* * * * *